No. 678,924. Patented July 23, 1901.
R. J. G. WOOD.
APPARATUS FOR TREATING AND UTILIZING SEWAGE.
(Application filed Feb. 16, 1901.)
(No Model.) 2 Sheets—Sheet 1.
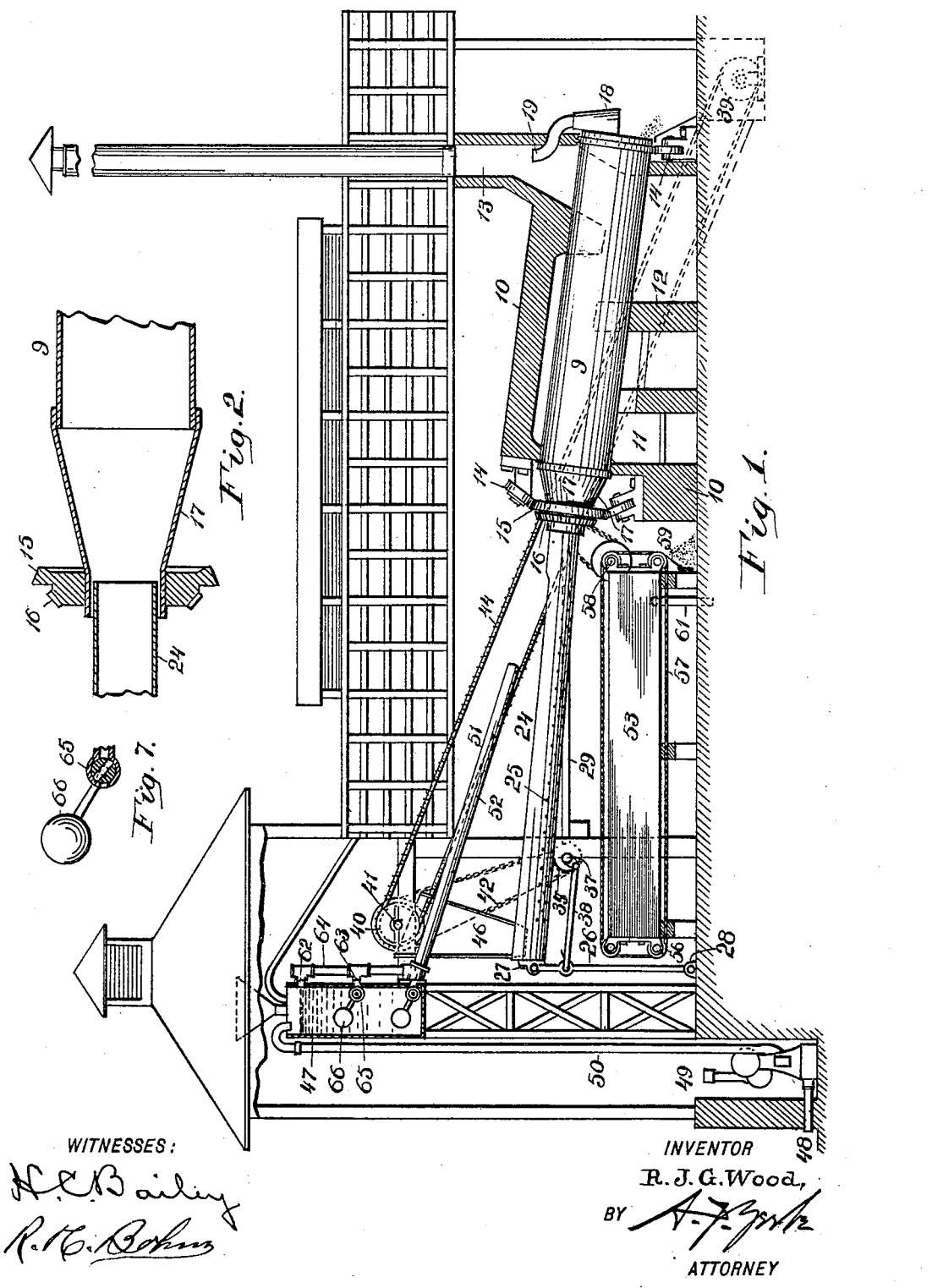
WITNESSES:
INVENTOR
R. J. G. Wood,
BY
ATTORNEY No. 678,924. Patented July 23, 1901.
R. J. G. WOOD.
APPARATUS FOR TREATING AND UTILIZING SEWAGE.
(Application filed Feb. 16, 1901.)
(No Model.) 2 Sheets—Sheet 2.
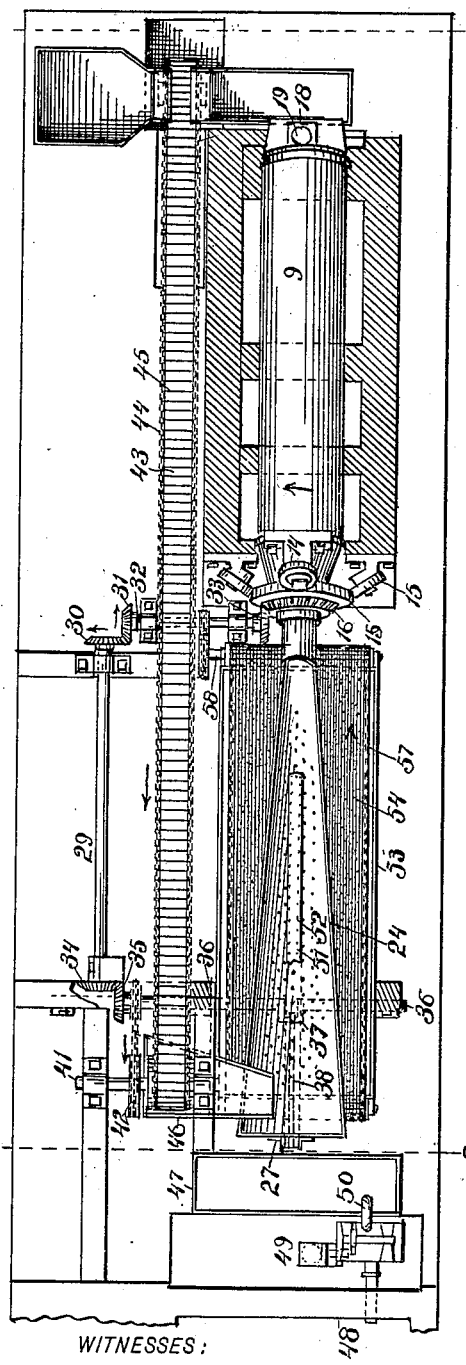
WITNESSES:
INVENTOR
R. J. G. Wood,
BY
ATTORNEY

UNITED STATES PATENT OFFICE.

ROBERT JOHNSON GRIFFIN WOOD, OF LEONIA, NEW JERSEY.

APPARATUS FOR TREATING AND UTILIZING SEWAGE.

SPECIFICATION forming part of Letters Patent No. 678,924, dated July 23, 1901.

Application filed February 16, 1901. Serial No. 47,603. (No model.)

*To all whom it may concern:*

Be it known that I, ROBERT JOHNSON GRIFFIN WOOD, a citizen of the United States, and a resident of Leonia, in the county of Bergen and State of New Jersey, have invented certain new and useful Improvements in Apparatus for Treating and Utilizing Sewage, of which the following is a specification.

The object of this invention is to provide a system for treating and utilizing sewage so constructed and arranged that all matter passing through the apparatus will be deodorized and purified in a rapid, simple, and efficient manner.

The invention consists of a train of mechanism which receives the sewage at one end, eliminates the water therefrom, and discharges the solid matter at the other end in such a condition that it can be used as a fertilizing product. It also provides a means for re-treating the solid matter and returning it automatically through the mechanism, all of which will now be set forth in detail.

In the accompanying drawings, Figure 1 is a side view of a system for treating and utilizing sewage, the heater portion being in section. Fig. 2 is a horizontal section of one end of the drying-cylinder and a portion of the hopper. Fig. 3 is a top or plan view of the system; Fig. 4, a view of the front end along line 7; Fig. 5, a view of the rear end along line 8; Fig. 6, a perspective detail of a portion of the straining mechanism, and Fig. 7 a view of float and cross-section of valve.

The system comprises a cylindrical shell 9, which is mounted in a brickwork casing 10 in such a manner that it is inclined to provide for the movement of the material through it. At one end of the cylinder 9 is a combustion-chamber 11, with suitable bridge-walls 12 for conducting the products of combustion to the flue or stack 13. The cylinder is mounted on antifriction-wheels 14, which are attached to the brickwork, these wheels being adapted to roll against suitable bearing-surfaces at the ends of the cylinder. For the purpose of retaining the cylinder in proper position and guarding against the downward thrust of the same the bearing 15, which is mounted on the reduced upper end of the cylinder, has a bevel edge, so that the wheels 14, which roll against the bevel-surface, are so inclined that the downward thrust of the cylinder will produce as little friction as possible when it turns. A bevel gear-wheel 16 is also secured to the reduced end of the cylinder, by means of which motion is imparted to the same. The object in reducing the throat of the cylinder, as at 17, is to provide for a more rapid movement of the material after it is discharged therein by the hopper. The front end of the cylinder is open and has a hood 18 with a duct 19 leading therefrom and discharging into the flue 13. Below the discharge end of the cylinder is a receptacle 20, the bottom of which is inclined, so that the contents of the receptacle will be discharged on a traveling conveyer. The discharge end of the receptacle 20 has a vertically-movable gate 21, as shown. Directly opposite this receptacle is a larger receptacle 22, also with an inclined bottom, and a gate 23, which is adapted to discharge its contents on the traveling conveyer.

Behind the cylinder 9 and resting in the throat thereof is the end of a hopper 24, the body of said hopper extending rearwardly and being substantially in alinement with the axis of the cylinder. This hopper has its rear end broader than its forward end and is provided on its inner side with perforations 25 of suitable size and at such intervals as to drain from the hopper all the available moisture in the material as it passes down the hopper before entering the cylinder 9. The rear end of the hopper 24 is supported by a standard 26, which is hinged to ears 27 on the end of the hopper and mounted in a base 28, attached to the floor.

The main line of shafting 29 has on its forward end a bevel-gear 30, which meshes with a similar gear 31 on the end of a cross-shaft 32, and a bevel-gear 33 on the inner end of this shaft engages with the bevel-gear 16 on the end of the cylinder 9. The rear end of the shaft 29 has a bevel-gear 34, which engages with a similar gear 35 on the cross-shaft 36, and directly beneath the hopper 24 this shaft 36 has a crank 37, Fig. 3, which imparts a reciprocating motion to the hopper through the link 38, which connects with the standard 26.

Alongside of the drying-cylinder 9 and the hopper 24 thus constructed I place an elevating device, which consists of a drum 39, mounted within a well at the front end of the drying-cylinder, said well being directly between the two receptacles 20 22, heretofore described. A second drum 40 is mounted in an elevated position at the rear end of the mechanism above the hopper, but to one side of the same. This drum being on the cross-shaft 41, and a sprocket-chain 42 passing over suitable sprocket-wheels on this shaft and on the cross-shaft 36 below, imparts motion to the drum 40. A carrier composed of an endless web 43, supported by sprocket-chains 44, passes around these drums, and as cross-bars or raised strips 44, made in any suitable manner, are secured to the web and chains at intervals, it is adapted to convey solid matter from the well to the upper end. The object of this is to provide a means whereby absorbent material—such as meadow-muck, marl, peat, sawdust, or the like—which is supplied from the receptacle 22 or the insufficiently-dried discharge product from the receptacle 20 may be conveyed to the hopper 24. In order to divert the contents of the conveyer to the hopper, an inclined chute 46 extends from the upper end of the conveyer to the rear end of the hopper 24, as shown.

Behind the hopper 24 is an elevated tank 47, which receives sewage from the sewage-reservoir 48 by means of a pump 49 and suitable conduit 50. The tank 47 has a main discharge-pipe 51, inclined as shown and provided with perforations 52 from end to end, so that the discharges therefrom will be distributed along the hopper, above which said pipe is placed. Directly below the hopper is a liquid-receiving tank 53, which is designed to receive the moisture from the sewage which passes through the earth and straining-hopper, having a discharge-pipe 61 at one end. During this operation more or less solid matter passes through the perforations 25, and as it is desirable that all of this material shall pass through the drying-cylinder and not be deposited in the receiving-tank I have provided a straining mechanism, which consists of an endless web of cloth or other fibrous material 54, which overlaps an endless belt of wire mesh 55. A pair of rollers 56 is placed at each end of the tanks, so that the web passes around the tank from end to end. The sides of the straining-web are secured to sprocket-chains 57, so that positive motion may be imparted to the web and also to insure strength to the same. One of the rollers 56 has at one end a projecting shaft 58, which carries a sprocket-wheel, and in line with this sprocket-wheel is a similar sprocket-wheel on the shaft 32, so that motion can be imparted to the straining-web. A scraper 59 or similar device is located at one end of the tank in contact with the web, so that the latter will be constantly exposed to the action of the scraper to keep it clean.

A large portion of sewage matter is lighter than the liquid portion, hence will float on the surface. For this reason it is necessary to provide the sewage-tank 47 with discharge-pipes at various points. These discharge-pipes are shown at 62 63, which connect with the main discharge-pipe 57 by a vertical pipe 64. The intermediate discharge-pipe 63 and the lower or main pipe are each provided with a valve 65, actuated by a float 66, so that as long as the pump 49 supplies a sufficient quantity of liquid to the tank the main portion of said liquid will escape through the upper pipe 62. The valves are not absolutely water-tight, thus permitting a small amount of the liquid to leak through, so that in the event the pump should cease to operate the liquid would gradually lower and first open the valve at pipe 63, allowing the solid matter on top to pass out, and when the surface of the liquid reaches the lower float it will open and permit the residue of the liquid to pass out through the main pipe.

It is obvious that in a system as herein shown the treatment of the sewage is automatic throughout, requiring only that the speed and amount of feed shall be regulated by an attendant. As the receptacle 22 contains the absorbent material which is to be mixed with and become a part of the resultant product of the apparatus, it is essential that the amount which flows therefrom should be regulated, and it is also frequently the case that the solid matter extracted from the sewage and passed through the drying-cylinder will require several successive exposures to the drying-cylinder. To provide for this, the receptacle 20 permits the operator to regulate the quantity which is fed to the carrier which conveys it back to the hopper.

What I claim as new is—

1. In a system for treating and utilizing sewage, a hopper for receiving the sewage and a drier for treating the solid matter, having in combination therewith a receptacle for receiving the treated product at the discharge end of the drier, a second receptacle alongside to receive absorbent material, and an elevator between said receptacles adapted to receive the products of either or both of said receptacles and elevate them to the hopper, as set forth.

2. In a system for treating and utilizing sewage, a hopper for receiving the sewage before it enters the drier, and a drier for treating the solid matter, in combination with a receptacle at the discharge end of the drier to receive the matter discharged from said drier, a second receptacle alongside for receiving absorbent material, and an elevator between said receptacles, to return said treated product and absorbent material to the hopper, both of said receptacles having adjustable gates adapted to discharge the contents on said elevator, as set forth.

3. In a system for treating and utilizing sewage a tank for receiving sewage having a perforated discharge-pipe, in combination with a reciprocating perforated hopper, and a revolving cylindrical drier, a liquid-receiving tank below the hopper, a traveling strainer passing over said tank, and a scraper for freeing the solid matter from the strainer, said strainer being connected by gearing mechanism with the revolving drier, as set forth.

4. In a system for treating and utilizing sewage, a strainer comprising a set of horizontal rollers mounted on each end of a tank, an endless web of wire-cloth on said rollers adapted to pass over and around the tank, a web of straining material over said wire mesh, and a sprocket-chain on the ends of the rollers, engaging with sprocket-wheels secured to said rollers, the sides of the straining-web and wire mesh being attached to said sprocket-chains, as set forth.

5. In a system for treating and utilizing sewage, the combination of a sewage supply-tank having a perforated discharge-pipe, a perforated hopper beneath said pipe, a revolving drier, a receptacle at the discharge end of the drier, a receptacle for discharging absorbent material, an elevator adapted to receive material from both receptacles and discharge same into the hopper, and a liquid-receiving tank below the hopper having a strainer, as herein set forth.

6. In a system for treating and utilizing sewage, a sewage-receiving tank having two or more discharge-pipes, one above the other, a main duct from the lower discharge-orifice, and a vertical pipe connecting said main duct with the other discharge-openings, said lower discharge-orifice and one or more of the other orifices having a valve and a float operating same for opening the discharge-orifices as the surface of the water approaches said orifices, as set forth.

Signed at New York, in the county of New York and State of New York, this 14th day of February, A. D. 1901.

ROBERT JOHNSON GRIFFIN WOOD.

Witnesses:
 H. C. BAILEY,
 J. S. ZERBE.